(12) United States Patent
Severa et al.

(10) Patent No.: US 11,501,432 B2
(45) Date of Patent: Nov. 15, 2022

(54) SPIKING RETINA MICROSCOPE

(71) Applicant: National Technology & Engineering Solutions of Sandia, LLC, Albuquerque, NM (US)

(72) Inventors: William Mark Severa, Albuquerque, NM (US); John Darby Smith, Albuquerque, NM (US); Suma George Cardwell, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 244 days.

(21) Appl. No.: 16/913,765

(22) Filed: Jun. 26, 2020

(65) Prior Publication Data

US 2021/0407075 A1 Dec. 30, 2021

(51) Int. Cl.
*G06K 9/00* (2022.01)
*G06T 7/00* (2017.01)
*H04N 5/225* (2006.01)
*H04N 7/18* (2006.01)
*G06T 5/00* (2006.01)
*G06K 9/62* (2022.01)
*G06T 7/20* (2017.01)

(52) U.S. Cl.
CPC .......... *G06T 7/0012* (2013.01); *G06K 9/6267* (2013.01); *G06T 5/002* (2013.01); *G06T 7/20* (2013.01); *H04N 5/2253* (2013.01); *H04N 5/2254* (2013.01); *H04N 7/18* (2013.01); *G06T 2207/10056* (2013.01); *G06T 2207/30024* (2013.01)

(58) Field of Classification Search
CPC .......... G06N 3/049; G06N 3/063; G06N 3/08; G06N 3/0675; G06N 3/088; G06N 3/0472; G06N 3/067; G06N 3/10; G06N 3/04; G06N 3/06; G06N 3/0635; G06V 10/20; G06V 10/462; G06V 10/451; G06V 20/40; G06V 30/195; G06V 10/955
See application file for complete search history.

(56) References Cited

U.S. PATENT DOCUMENTS

| 9,047,568 B1 * | 6/2015 | Fisher | G06N 3/049 |
| 9,436,909 B2 * | 9/2016 | Piekniewski | G06N 3/08 |
| 2004/0199079 A1 * | 10/2004 | Chuck | A61B 5/441 |
| | | | 600/477 |

OTHER PUBLICATIONS

Guillermo, G. et al., "Event-based Vision: A Survey", arXiv:1904.08405v2 [cs.CV] Feb. 26, 2020, 30 pages.

(Continued)

*Primary Examiner* — Alex Kok S Liew
(74) *Attorney, Agent, or Firm* — Yee & Associates, P.C.

(57) ABSTRACT

A spiking retina microscope comprising microscope optics and a neuromorphic imaging sensor. The microscope optics are configured to direct a magnified image of a specimen onto the neuromorphic imaging sensor. The neuromorphic imaging sensor comprises a plurality of sensor elements that are configured to generate spike signals in response to integrated light from the magnified image reaching a threshold. The spike signals may be processed by a processor unit to generate a result, such as tracking biological particles in a specimen comprising biological material.

20 Claims, 3 Drawing Sheets

(56) References Cited

OTHER PUBLICATIONS

Ni, Z. et al., "Asynchronous event-based high speed vision for microparticle tracking", Journal of Microscopy, vol. 245 Pt 3 (2012), pp. 236-244.
Wang, Q. and Moerner, W.E., "Dissecting pigment architecture of individual photosynthetic antenna complexes in solution", PNAS, vol. 112, No. 45, pp. 13880-13885 (www.pnas.org/cgi/doi/10.1073/pnas.1514027112).

* cited by examiner

SPIKING RETINA MICROSCOPE

GOVERNMENT LICENSE RIGHTS

This invention was made with Government support under Contract No. DE-NA0003525 awarded by the United States Department of Energy/National Nuclear Security Administration. The U.S. Government has certain rights in the invention.

BACKGROUND INFORMATION

1. Field

The present disclosure relates generally to optical microscopy. More particularly, illustrative embodiments relate to systems and methods for capturing and processing optical microscopy images.

2. Background

Conventional image sensors, or frame-based image sensors, present motion by capturing a number of still frames each second. When recording with frame-based image sensors, the sensor applies an arbitrary frame rate specified by an external clock to the whole scene and subsequently obtains optical information from all the pixels at the same time in every single frame.

Unlike conventional frame-based image sensors, neuromorphic sensors, or event-driven sensors, are a type of imaging sensor that responds to brightness changes in the scene asynchronously and independently for every pixel. Consequently, the output of an event-driven sensor is a variable data rate sequence of digital events, with each event representing a change of brightness of predefined magnitude at a pixel at a particular time.

Event-driven sensors offer numerous advantages over the standard cameras. For instance, event-driven sensors detect events with microsecond resolution and therefore can capture very fast motions without suffering from motion blur. Furthermore, event-driven image sensors have minimal latency because each pixel works independently, and the information of event change is transmitted as soon as they are detected. Also, since event-driven sensors transmit only brightness changes but not redundant data, power required for operating event-driven imaging system is significantly lower compares to the frame-based imaging system.

Currently, neuromorphic sensors have been developed for the use on the systems such as telescopes and drones. It has also been used for technologies such as, 3D reconstruction, Depth estimation, Motion Segmentation, Pose estimation and Visual-Inertial Odometry. However, neuromorphic sensors may have other potential applications that have not been explored.

Therefore, it would be desirable to have a method and apparatus that take into account at least some of the issues discussed above, as well as other possible issues.

SUMMARY

The illustrative embodiments provide a spiking retina microscope comprising microscope optics and a neuromorphic imaging sensor. The microscope optics are configured to direct a magnified image of a specimen onto the neuromorphic imaging sensor. The neuromorphic imaging sensor comprises a plurality of sensor elements that are configured to generate spike signals in response to integrated light from the magnified image reaching a threshold.

In another illustrative embodiment, a method of examining a specimen using a spiking retina microscope is provided. The spiking retina microscope comprises microscope optics and a neuromorphic imaging sensor. The specimen is placed in the spiking retina microscope such that a magnified image of the specimen is directed from the microscope optics onto the neuromorphic imaging sensor. Spike signals are generated by a plurality of sensor elements in the neuromorphic imaging sensor in response to integrated light from the magnified image reaching a threshold. The spike signals from the neuromorphic imaging sensor are processed to generate a result.

In another illustrative embodiment, a method of tracking biological particles using a spiking retina microscope is provided. The spiking retina microscope comprises microscope optics and a neuromorphic imaging sensor. A specimen comprising biological material is placed in the spiking retina microscope such that a magnified image of the specimen is directed from the microscope optics onto the neuromorphic imaging sensor. Spike signals are generated by a plurality of sensor elements in the neuromorphic imaging sensor in response to integrated light from the magnified image reaching a threshold. The spike signals from the neuromorphic imaging sensor are processed to track the biological particles in the biological material.

The features and functions of the illustrative embodiments may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the technologies to which neuromorphic sensors have been applied do not address the difficulties encountered in microscopical imaging. In particular, tracking particles in the presence of autofluorescence.

Methods developed for tracking microparticles include tagging molecules of interest with fluorophores. However, with autofluorescence of the ambient space, conventional technology loses the ability to distinguish the interested particles from the background, which causes loss of information in the output.

Illustrative embodiments provide a spiking retina microscope that includes microscopy optics and illumination in combination with a neuromorphic imaging sensor. Using spiking neurons as the fundamental computational unit allows for ultra-low latency imaging. Illustrative embodiments, applied to microscopy, allow for extremely high refresh rate imagery of microscopic entities.

Spiking imaging sensors have previously been developed for use on systems such as telescopes and drones. However, the application of such sensors to biological microscopy is novel and represents an improvement over existing systems. Since the advancement in imaging is contained within the image sensor, illustrative embodiments may be implemented without modified optics or lighting. The event-based nature of the sensor used in illustrative embodiments allows high-quality imaging to be performed at increased sensitivity and for high-dynamic range scenes.

Figure 1:
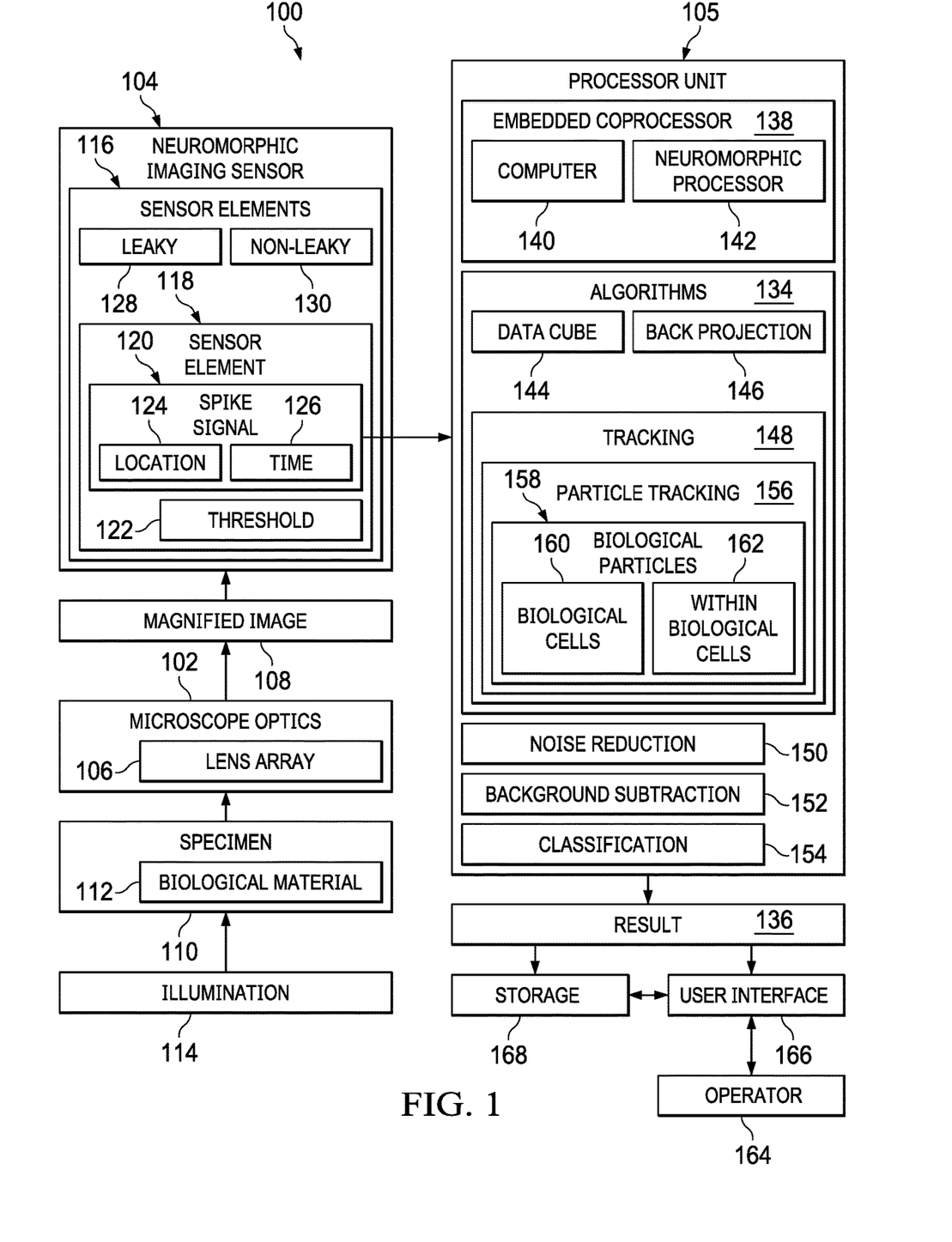
FIG. 1 is an illustration of a block diagram of a spiking retina microscope in accordance with an illustrative embodiment.

Turning to FIG. 1, an illustration of a block diagram of a spiking retina microscope is depicted in accordance with an illustrative embodiment. Spiking retina microscope 100 includes microscope optics 102 and neuromorphic imaging sensor 104. Spiking retina microscope 100 also may include processor unit 105.

Microscope optics 102 may include any appropriate optical components for implementing an optical microscope. For example, microscope optics 102 may include lens array 106. Lens array 106 may include any appropriate lenses and other optical components along with any appropriate structures to support the optical components and allow adjustment of the optical components to direct a focused magnified image 108 of specimen 110 onto neuromorphic imaging sensor 104.

Specimen 110 may include any appropriate object that may be examined by an optical microscope. For example, without limitation, specimen 110 may include biological material 112. Any appropriate structure may be provided to support specimen 110 with respect to microscope optics 102.

Appropriate illumination 114 of specimen 110 also may be provided. Any appropriate source of illumination 114 may be provided. Illumination 114 preferably may be adjustable, as appropriate. Neuromorphic imaging sensor 104 preferably is not sensitive to the type of illumination 114 and preferably may be compatible with dark field, bright field, total internal reflection fluorescence, phase contrast interference, and any other forms of microscopy.

Neuromorphic imaging sensor 104 is an event-driven sensor. Spiking retina microscope 100 in accordance with an illustrative embodiment may include one neuromorphic imaging sensor 104 or more than one neuromorphic imaging sensor 104.

Neuromorphic imaging sensor 104 includes plurality of sensor elements 116 arranged in an image plane. Magnified image 108 of specimen 110 is directed onto the image plane such that each sensor element 118 in plurality of sensor elements 116 is responsive to light from a corresponding location on specimen 110.

Each sensor element 118 in plurality of sensors elements 116 is configured to integrate incoming light and generate spike signal 120 in response to the integrated light reaching pre-determined threshold 122. Spike signal 120 includes information indicating location 124 and time 126 of occurrence of an event in magnified image 108. Spike signal 120 is an all-or-nothing packet containing information that threshold 122 has been met, but not the intensity of the signal. This all-or-nothing nature of spike signal 120 means a dramatic reduction in the bandwidth required by the system and hence an increase in response times. This is in contrast to a framed sensor where raster images are recorded.

Sensor elements 116 may be leaky 128 or non-leaky 130. Examples of neuromorphic imaging sensors with leaky 128 sensor elements 116 include, without limitation, the dynamic vision sensor, DVS, and the dynamic and active-pixel vision sensor, DAVIS. An example of a neuromorphic imaging sensor with non-leaky 130 sensor elements 116 includes, without limitation, the spiking processing array, SPARR, sensor.

In the case where sensor elements 116 in neuromorphic imaging sensor 104 are leaky 128, the leak constant effectively computes a difference operation on the scene. That is, only motion or other changes in luminance is detected by the sensor. This differencing further lessens the bandwidth required by the system, though at a cost proportional to the refresh rate. In a non-leaky 130 system, the objects in the scene or the sensor must be moved slightly (though potentially randomly) so that the difference can be determined by subtracting a background estimation (either local or globally). In both cases, motion of the sensor (either deliberate or random) increases the fidelity of the signal, in contrast to traditional imaging methods.

Each spike signal 120 generated by neuromorphic imaging sensor 104 is sent to processor unit 105 for processing. Spike signal 120 may be sent to processor unit 105 in any appropriate manner or format. Preferably, spike signal 120 may be sent to processor unit 105 using Address Event Representation, AER, or a similar format. Processor unit 105 is configured to process spike signal 120 using appropriate algorithms 134 to generate result 136.

Processor unit 105 may be embedded on neuromorphic imaging sensor 104. For example, without limitation, processor unit 105 may be implemented as embedded coprocessor 138 on neuromorphic imaging sensor 104. Such a compute-on-sensor approach enables faster communication due to colocation. Alternatively, processor unit 105 may be implemented separately from neuromorphic imaging sensor 104. In this case, processor unit 105 may be in communication with neuromorphic imaging sensor 104 in any appropriate manner.

Processor unit 105 may be implemented in computer 140 or neuromorphic processor 142. Computer 140 may comprise any appropriate von Neumann computing device. The type of processor unit 105 used may be selected based on algorithms 134 to be implemented in processor unit 105. For example, neuromorphic processor 142 is better at relatively simple image processing, such as object tracking and feature detection. Neuromorphic processor 142 would require very low power for in-the-field imaging. Neuromorphic processor 142 also is uniquely suited to process AER-format event output and spatio-temporal classification. Computer 140 could perform in-depth full-scene reconstruction, giving a complete picture of the scene. In an alternative implementation, processor unit 105 may be implemented using both computer 140 and neuromorphic processor 142.

Various algorithms 134 may be implemented in processor unit 105. A variety of algorithmic approaches may be implemented in processor unit 105 independent of the processor choice. These algorithms can be implemented on either computer 140 or neuromorphic processor 142. Examples of such algorithmic approaches include, without limitation, data cube 144 and back projection 146.

In data cube 144 approach, an (n+1)-d cube is defined to represent an n-d image where the additional dimension is time. Spike signals can then be imposed from the sensor to the appropriate spatial and temporal locations in time. This approach is relatively straightforward. Viewing slices across time provides a moving image of the scene. However, this method is relatively data-heavy. Rasterized versions of this method can use traditional frame-based processing methods.

Back projection 146 may be more preferred. In this method, given spike signal 120, the geometry of microscope optics 102 can be followed relative to the sensor to generate a ray in 3D space. That is, a vector $\vec{u}+\vec{v}x$ is determined, where $\vec{u}$, corresponds to the location of the pixel in physical space and $\vec{v}$ represents the direction to the event along with a time t. This ray represents a sampling of the light reflected by an object in the scene. Given thousands of spike signals, a ray dictionary is constructed. The relationship between two events can often be determined by the intersection or distance between of these two rays relative to the location of the sensor, which can be easily determined by an embedded accelerometer, if needed. Common data processing methods are then relatively simple to implement.

Algorithms 134 may implement such data processing methods as, for example, without limitation, tracking 148, noise reduction 150, background subtraction 152, and classification 154. Tracking 148 may include tracking an object in specimen 110. Tracking 148 may be performed by a clustering of nearby rays. Noise reduction 150 may be implemented by removing rays that are distant from all other rays. Background subtraction 152, necessary if the sensor moves, may be performed by subtracting the location of the sensor from the event rays. Classification 154 may include recognizing certain classes or types of objects in specimen 110. Classification 154 may be implemented using existing classification methods by applying the methods either to the rays themselves or their projection back into three-dimensional space.

Tracking 148 may include particle tracking 156. In particular, illustrative embodiments may include tracking 148 of biological particles 158 in biological material 112.

With any microscopy technique, magnification creates a probabilistic spread in signal. This lends uncertainty to particle tracking and imaging. Additionally, when interference between background signal and particles of interest combine, particles may be lost and become indistinguishable from background. When tracking multiple particles, a similar problem can occur when two or more particles of interest collocate. In current techniques, signal can be resolved to track or image with high certainty using a combination of mathematics, probability, and experimental setup to produce high-resolution images. The processing of sensor data should perform any necessary mathematical and probabilistic calculations to meet or exceed standard high-resolution techniques. While this can resolve problems with imaging, the issue of collocation remains due to the frame rate restrictions of current microscopy.

Event-driven microscopy in accordance with an illustrative embodiment has no such issue. For example, when tracking motor proteins along microtubules, data is often discarded because two proteins appear to collocate, making their individual paths indistinguishable. By use spiking retina microscope 100 in accordance with an illustrative embodiment, operators would be able to discern the individual paths since they only appear to collocate due to the frame rate.

Tracking 148 of biological particles 158 may include tracking of biological cells 160 as well as tracking of biological particles 158 within biological cells 162. Thus, particle tracking 156 in accordance with an illustrative embodiment need not be limited to within cell dynamics. When tracking within cell, most experiments use some sort of tracking molecule (green fluorescent protein, gold nano particles, etc.) as a proxy for the protein/particle/molecule of interest. These can be assumed to be relatively spherical in size as the spread from the illumination under microscopy will be roughly spherical. Additionally, some experiments track qdots or beads which again can be assumed spherical. Algorithms 134 for tracking 148 in accordance with an illustrative embodiment will be able to track on the cellular level as well, tracking cells or bacteria that deform, wiggle, or otherwise alter their physical shape. Illustrative embodiments may be equipped to handle a changing topology in cell-division, tracking not only a new object, but also retaining the information of what the new object came from.

Results 136 may be presented to operator 164 on user interface 166 in any appropriate manner. Alternatively, results 136 may be saved in storage 168 for later display or further analysis.

The illustration of spiking retina microscope 100 in FIG. 1 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 2:
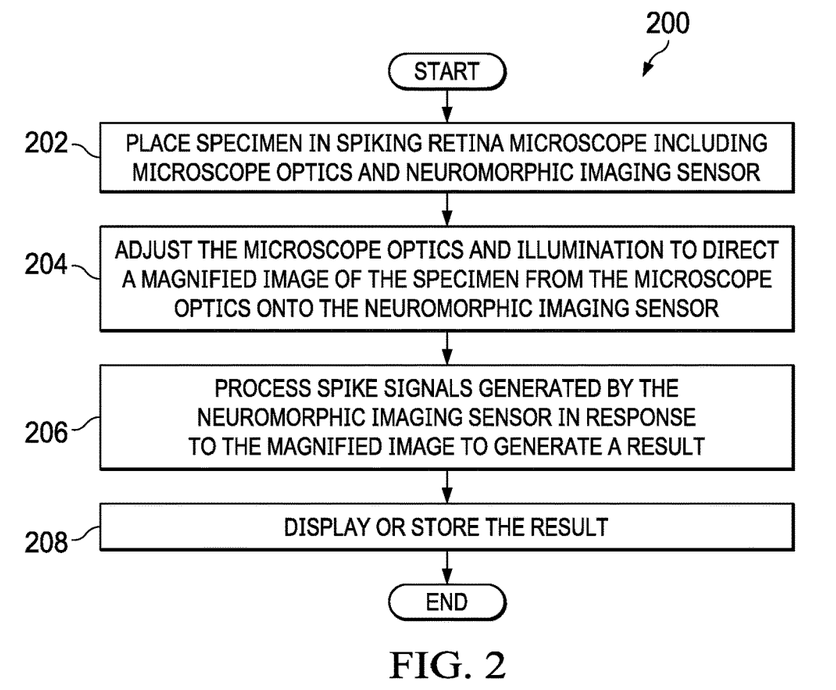
FIG. 2 is an illustration of a flowchart of a process for examining a specimen using a spiking retina microscope in accordance with an illustrative embodiment.

Turning to FIG. 2, an illustration of a flowchart of process 200 for examining a specimen using a spiking retina microscope is depicted in accordance with an illustrative embodiment. For example, process 200 may be implemented in spiking retina microscope 100 in FIG. 1.

Process 200 begins with placing a specimen in a spiking retina microscope that includes microscope optics and a neuromorphic imaging sensor (operation 202). The microscope optics and illumination of the specimen may be adjusted, as necessary, to direct a magnified image of the specimen from the microscope optics onto the neuromorphic imaging sensor (operation 204). Spike signals generated by the neuromorphic imaging sensor in response to the magnified image then may be processed to generate a result (operation 206). The result may be displayed to an operator or stored for later use (operation 208), with the process terminating thereafter. Alternatively, the result may be both displayed and stored in operation 208.

Figure 3:
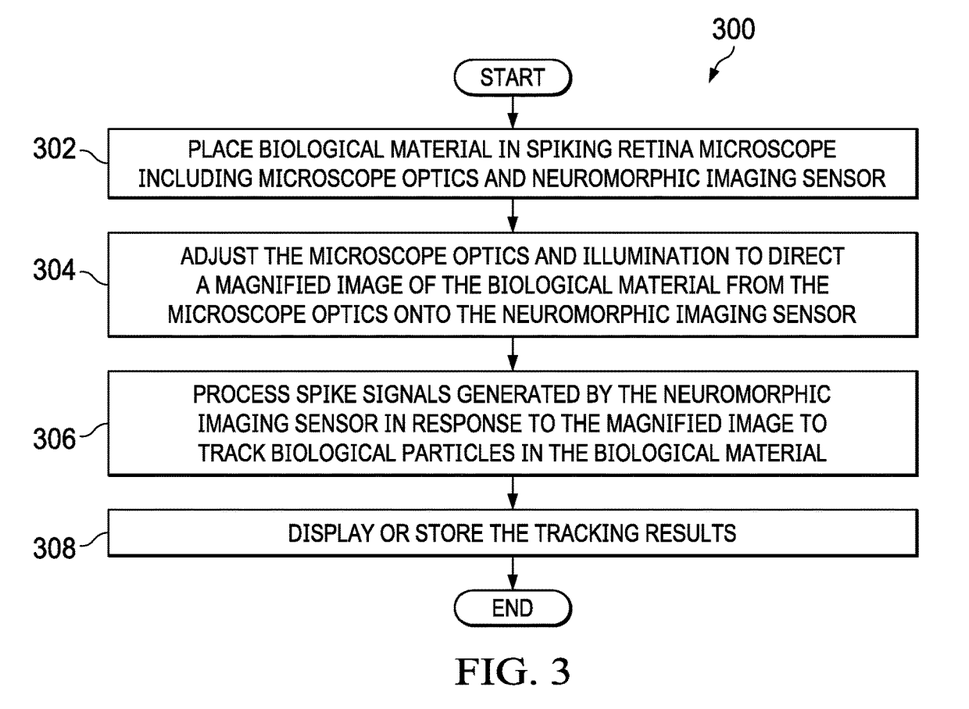
FIG. 3 is an illustration of a flowchart of a process for tracking biological particles using a spiking retina microscope in accordance with an illustrative embodiment.

Turning to FIG. 3, an illustration of a flowchart of process 300 for tracking biological particles using a spiking retina microscope is depicted in accordance with an illustrative embodiment. For example, process 300 may be implemented in spiking retina microscope 100 in FIG. 1.

Process 300 begins with placing biological material in a spiking retina microscope that includes microscope optics and a neuromorphic imaging sensor (operation 302). The microscope optics and illumination of the biological material may be adjusted, as necessary, to direct a magnified image of the biological material from the microscope optics onto the neuromorphic imaging sensor (operation 304). Spike signals generated by the neuromorphic imaging sensor in response to the magnified image then may be processed to track biological particles in the biological material (operation 306). For example, without limitation, operation 306 may include tracking biological cells in the biological material, biological particles within biological cells in the biological material, any other appropriate type of biological particles, or various different types of biological particles. The tracking results may be displayed to an operator or stored for later use (operation 308), with the process terminating thereafter. Alternatively, the tracking results may be both displayed and stored in operation 308. For example, without limitation, the tracking results may include tracks of the movement of the biological particles.

Figure 4:
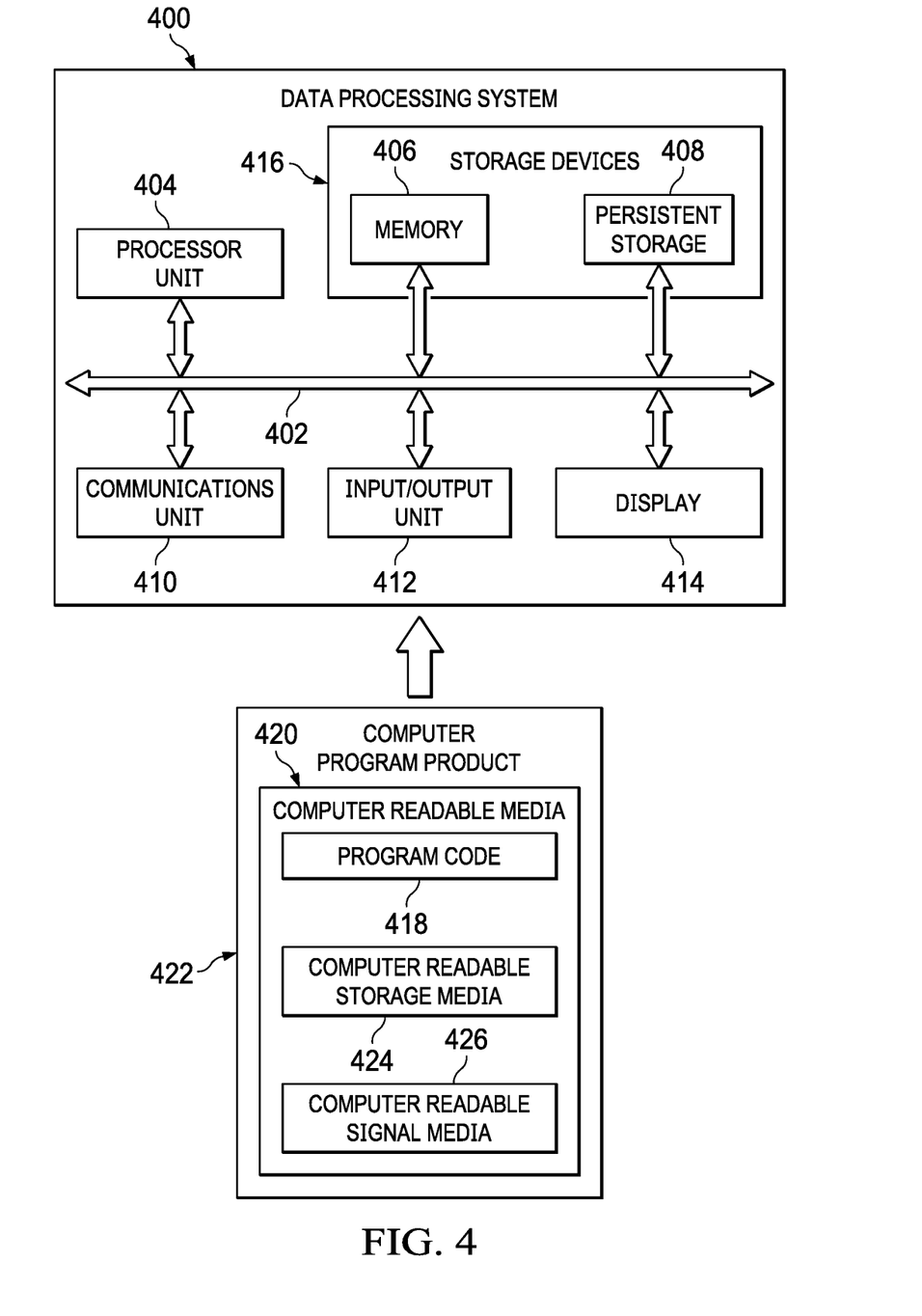
FIG. 4 is an illustration of a block diagram of a data processing system in accordance with an illustrative embodiment.

Turning to FIG. 4, an illustration of a block diagram of a data processing system is depicted in accordance with an illustrative embodiment. Data processing system 400 is an example of one possible implementation of computer 140 implementing processor unit 105 in FIG. 1.

In this illustrative example, data processing system 400 includes communications fabric 402. Communications fabric 402 provides communications between processor unit 404, memory 406, persistent storage 408, communications unit 410, input/output (I/O) unit 412, and display 414. Memory 406, persistent storage 408, communications unit 410, input/output (I/O) unit 412, and display 414 are examples of resources accessible by processor unit 404 via communications fabric 402.

Processor unit 404 serves to run instructions for software that may be loaded into memory 406. Processor unit 404 may be a number of processors, a multi-processor core, or some other type of processor, depending on the particular implementation. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and other suitable information either on a temporary basis or a permanent basis. Storage devices 416 also may be referred to as computer readable storage devices in these examples. Memory 406, in these examples, may be, for example, a random access memory or any other suitable volatile or non-volatile storage device. Persistent storage 608 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program instructions, program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400.

In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 600 are not meant to provide architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of running program code. As one example, data processing system 400 may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted, because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system.

Additionally, communications unit 410 may include a number of devices that transmit data, receive data, or both transmit and receive data. Communications unit 410 may be, for example, a modem or a network adapter, two network adapters, or some combination thereof. Further, a memory may be, for example, memory 406, or a cache, such as that found in an interface and memory controller hub that may be present in communications fabric 402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A spiking retina microscope, comprising:
   microscope optics; and
   a neuromorphic imaging sensor, wherein the microscope optics are configured to direct a magnified image of a specimen onto the neuromorphic imaging sensor and the neuromorphic imaging sensor comprises a plurality of sensor elements that are configured to generate spike signals in response to integrated light from the magnified image reaching a threshold, wherein each of the spike signals identifies a location in the magnified image and a time of occurrence of the spike signal.

2. The spiking retina microscope of claim 1, further comprising illumination of the specimen.

3. The spiking retina microscope of claim 1, wherein the plurality of sensor elements are leaky sensor elements.

4. The spiking retina microscope of claim 1, wherein the plurality of sensor elements are non-leaky sensor elements.

5. The spiking retina microscope of claim 1, further comprising a processor unit configured to process the spike signals to generate a result.

6. The spiking retina microscope of claim 5, wherein the processor unit is an embedded coprocessor on the neuromorphic imaging sensor.

7. The spiking retina microscope of claim 5, wherein the processor unit is a computer or a neuromorphic processor.

8. The spiking retina microscope of claim 5, wherein the processor unit is configured to process the spike signals to track biological particles in the specimen comprising biological material.

9. A method of examining a specimen, comprising:
   placing the specimen in a spiking retina microscope, wherein the spiking retina microscope comprises microscope optics and a neuromorphic imaging sensor, such that a magnified image of the specimen is directed from the microscope optics onto the neuromorphic imaging sensor; and
   processing spike signals from the neuromorphic imaging sensor to generate a result, wherein the spike signals are generated by a plurality of sensor elements in the neuromorphic imaging sensor in response to integrated light from the magnified image reaching a threshold, and wherein each of the spike signals identifies a location in the magnified image and a time of occurrence of the spike signal.

10. The method of claim 9, further comprising illuminating the specimen.

11. The method of claim 9, wherein the plurality of sensor elements are leaky sensor elements.

12. The method of claim 9, wherein the plurality of sensor elements are non-leaky sensor elements.

13. The method of claim 9, wherein processing the spike signals comprises processing the spike signals by an embedded coprocessor on the neuromorphic imaging sensor.

14. The method of claim 9, wherein processing the spike signals comprises processing the spike signals by a processor unit comprising a computer or a neuromorphic processor.

15. The method of claim 9, wherein processing the spike signals comprises processing the spike signals using a data cube or back projection.

16. The method of claim 9, wherein processing the spike signals to generate the result comprises tracking an object in the specimen, noise reduction, background subtraction, or classification of an object in the specimen.

17. A method of tracking biological particles, comprising:
placing a specimen comprising biological material in a spiking retina microscope, wherein the spiking retina microscope comprises microscope optics and a neuromorphic imaging sensor, such that a magnified image of the specimen is directed from the microscope optics onto the neuromorphic imaging sensor; and processing spike signals from the neuromorphic imaging sensor to track the biological particles in the biological material, wherein the spike signals are generated by a plurality of sensor elements in the neuromorphic imaging sensor in response to integrated light from the magnified image reaching a threshold, and wherein each of the spike signals identifies a location in the magnified image and a time of occurrence of the spike signal.

18. The method of claim 17, wherein the biological particles comprise biological cells or biological particles within biological cells.

19. The spiking retina microscope of claim 1, wherein the neuromorphic imaging sensor comprises a dynamic vision sensor (DVS) or a dynamic and active-pixel vision sensor (DAVIS).

20. The spiking retina microscope of claim 1, wherein the neuromorphic imaging sensor comprises a spiking processing array (SPARR).

* * * * *